United States Patent [19]
Colvin

[11] 3,760,831
[45] Sept. 25, 1973

[54] GAS FLOW CONTROL SYSTEM FOR AN ANALYTICAL INSTRUMENT

[75] Inventor: Alex D. Colvin, Oak Park, Mich.

[73] Assignee: Ford Motor Company, Dearborn, Mich.

[22] Filed: Nov. 1, 1971

[21] Appl. No.: 194,245

[52] U.S. Cl. .............................. 137/117, 23/254 R
[51] Int. Cl. ............................................. G05d 7/01
[58] Field of Search ...................... 137/2, 3, 7, 8, 9, 137/13, 114, 117, 118; 23/254 R

[56] References Cited
UNITED STATES PATENTS

| | | | |
|---|---|---|---|
| 3,152,603 | 10/1964 | Zeisloft | 137/117 |
| 2,258,758 | 10/1941 | Haultain | 137/117 |
| 3,285,703 | 11/1966 | Narita et al. | 23/254 R |
| 3,464,434 | 9/1969 | Nielson | 137/7 X |
| 3,543,784 | 12/1970 | Smith | 137/8 X |
| 3,128,783 | 4/1964 | Cowles et al. | 137/117 |

Primary Examiner—Robert G. Nilson
Attorney—Keith L. Zerschling et al.

[57] ABSTRACT

Gaseous sample mixture flows through two restrictive capillaries in series with each other on its way to a chemiluminescent reaction chamber. A bypass pump has its inlet connected to the junction of the capillaries and its outlet communicating with the atmosphere. A pressure regulator connects the inlet of the bypass pump with the atmosphere. The pressure regulator responds to the pressure difference between the junction of the capillaries and the reaction chamber to control the flow of atmospheric air to the bypass pump inlet and thereby maintains a constant sample mixture flow rate into the reaction chamber despite variations in the pressure of the source of the sample mixture.

4 Claims, 3 Drawing Figures

GAS FLOW CONTROL SYSTEM FOR AN ANALYTICAL INSTRUMENT

BACKGROUND OF THE INVENTION

This invention relates to the subject matter of U.S. Pat. application Colvin et al. Ser. No. 146,927 entitled "Chemiluminescent Instrument" and Warnick et al. Ser. No. 146,929, entitled "Chemiluminescent Process" both filed on May 15, 1971.

These related applications describe a chemiluminescent detector capable of measuring widely varying amounts of nitric oxide in gaseous mixtures with excellent accuracy, sensitivity, and reproducibility. Gaseous sample mixtures from the atmosphere, the combustion products of automotive engines and other power plants including aircraft engines and furnaces and gases involved in various chemical processes can be analyzed on a continuous basis with the detector.

The chemiluminescent reaction utilized by the detector usually is carried out at a pressure below atmospheric. To produce the desired reaction pressure, an exhaust pump is connected to the outlet of a reaction chamber and gaseous sample mixture and gaseous reactant mixture are throttled in respective capillaries prior to entering the reaction chamber. Appropriate selection of the exhaust pump and the capillaries produces the desired subatmospheric pressure in the reaction chamber.

This system operates satisfactorily when the gaseous sample mixture is available at a substantially constant pressure. To accommodate gaseous sample mixtures of varying pressures, pressure regulating devices are included in the flow path of the sample mixture. Such pressure regulating devices maintain a constant pressure upstream of the sample capillary and generally perform adequately in maintaining a constant sample flow. The regulators usually include some polymeric materials, however, and the gaseous sample mixtures usually contain unburned hydrocarbons, carbon monoxide, and nitrogen oxides that react therewith. Such reactions not only shorten the useful life of the regulator but also change the composition of the sample mixture eventually reaching the reaction chamber.

SUMMARY OF THE INVENTION

This invention provides a flow control system for an analytical instrument capable of measuring the amount of a gaseous constituent in a gaseous sample mixture that avoids contact between variable flow controlling devices and the gaseous sample mixture eventually taking part in the analytical reaction. The flow control system maintains a constant sample mixture flow rate despite wide variations in the pressure of the sample mixture source. In the system, a first flow restricting device in series with a second flow restricting device connects the sample mixture source to the reaction chamber. An exhaust pump connected to the reaction chamber outlet draws sample mixture through the flow restricting devices and into the reaction chamber. A bypass mechanism is connected to the junction of the flow restricting devices and includes a bypass pump that draws off a portion of the gaseous mixture from the junction. A regulating device located in the bypass mechanism responds to the pressure difference between the junction of the flow restricting devices and the reaction chamber to maintain a constant pressure at the junction and thus regulates in an indirect but highly accurate manner the flow rate of sample mixture into the reaction chamber. The sample mixture reaching the reaction chamber passes only through the flow restricting devices, both of which have fixed restrictions and can be made of inert materials such as glass.

Proper flow control over a wide range of sample mixture source pressures and improved life are achieved by including the regulating device in a tube connecting the inlet of the bypass pump to the atmosphere. The inlet pressure of the bypass pump is controlled by regulating air flow through the tube and that inlet pressure in turn determines the pressure at the junction of the flow restricting devices. None of the sample mixture contacts the regulating device.

A flow indicating or rectifying device preferably is located between the junction of the flow restricting devices and the inlet of the bypass pump to provide a visual indication that adequate sample mixture is flowing to the reaction chamber. Such devices are highly desirable since the regulating device usually is capable of regulating the pressure at the junction to a value indicative of proper flow even though no sample mixture is reaching the junction.

The flow control system is useful with any analytical instrument that requires constant gas flow rates and the term "reaction" as used herein is intended to include flame ionization processes, light absorption and scattering processes, chemiluminescent processes, etc. An important application of the system lies in the use of the aforementioned chemiluminescent detector for analyzing exhaust gases from vehicles. A certain volume of the exhaust gases usually is collected and at some later time that volume is analyzed for various gaseous constituents including nitric oxide and nitrogen dioxide. If rigid collection containers are used, depletion of the volume during analysis reduces the pressure of the remainder and thereby tends to reduce flow rates into the detector. Analyzing exhaust gases directly from the vehicle exhaust system also produces pressure changes that are eliminated by the system of this invention.

DETAILED DESCRIPTION

Figure 1:
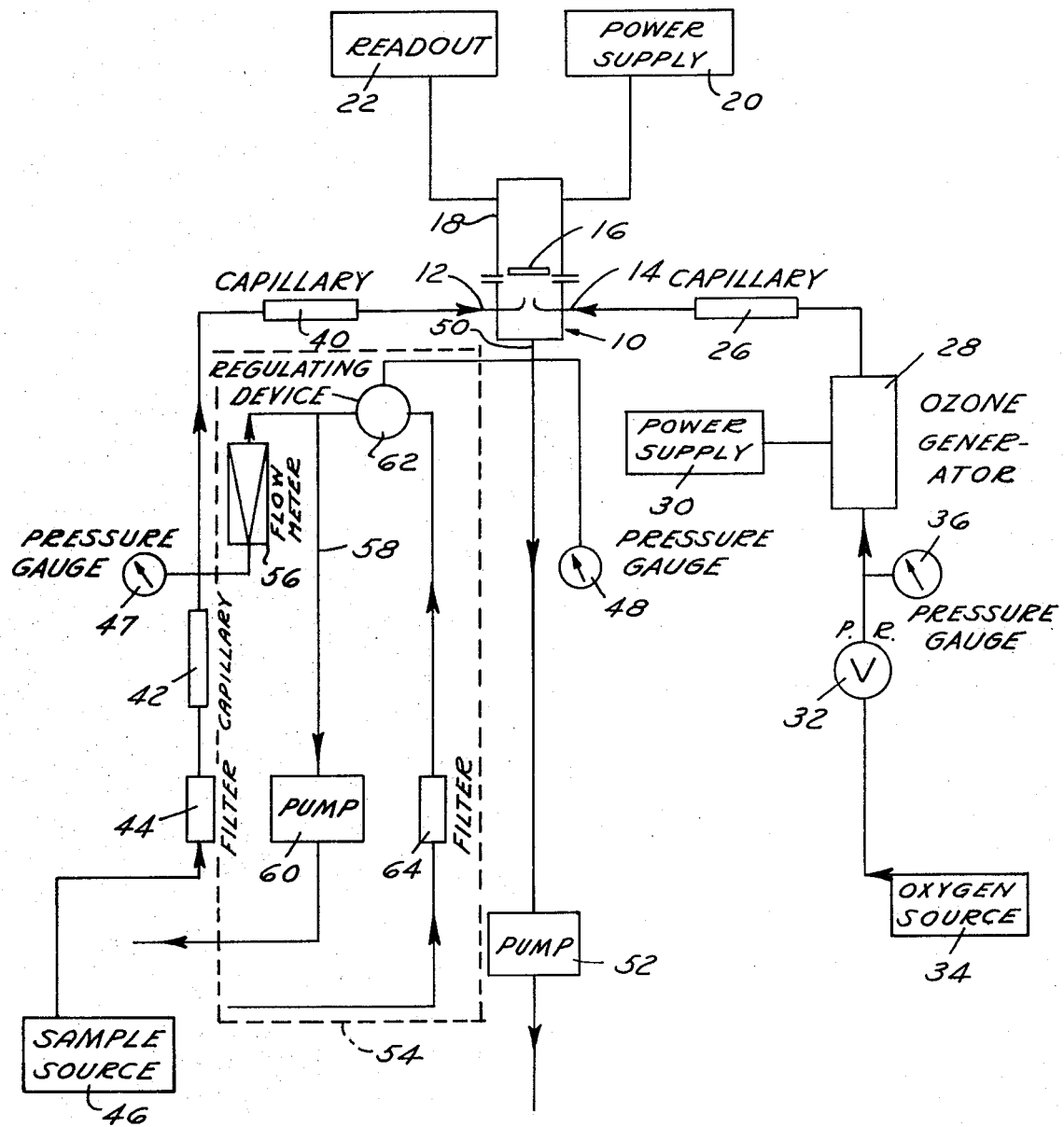
FIG. 1 is a schematic illustrating the use of the flow control system of this invention in a chemiluminescent detector.
Figure 2:
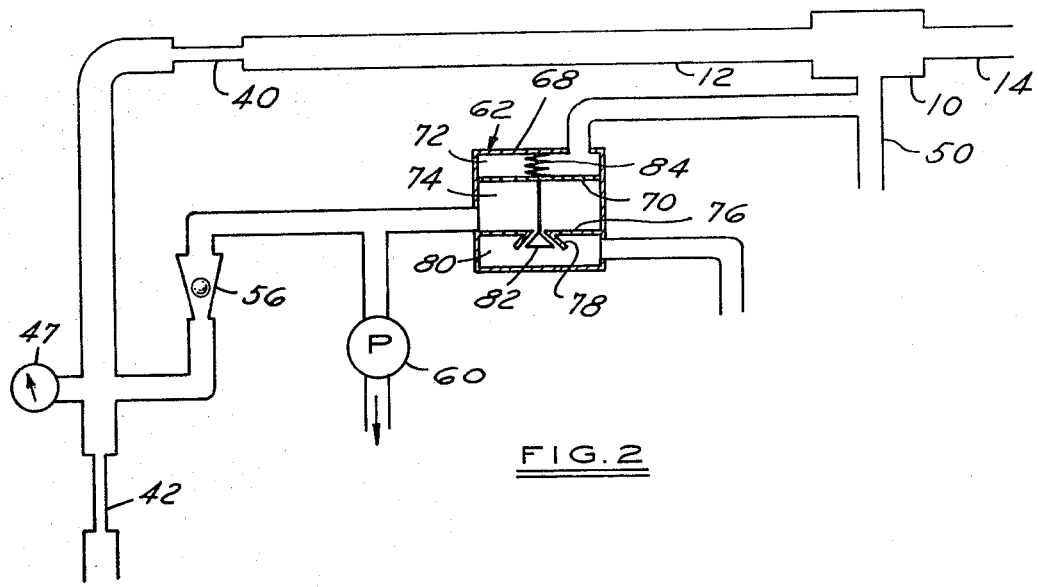
FIG. 2 is a detail of an alternate bypass flow mechanism in which the regulating device is located in a tube connecting the bypass pump inlet with the atmosphere. The regulating device uses reaction chamber pressure as the reference pressure so that the device in effect responds to the pressure drop across the downstream flow restriction.

Referring to FIGS. 1 and 2, a chemiluminescent detector for measuring amounts of nitric oxide in a gaseous sample mixture by reaction with an oxygen-ozone reactant mixture comprises a reaction chamber 10. A sample conduit 12 and a reactant conduit 14 connect with the interior of reaction chamber 10. A light transmitting element 16 is located in one wall of reaction chamber 10 and a light detecting device 18 is located outside of light transmitting element 16. An electrical power supply 20 and amplifying and readout circuitry 22 are connected to light detecting device 18.

Reactant conduit 14 is connected through a capillary 26 to an ozone generator 28. Ozone generator 28 is supplied with electrical power by a power source 30. A regulating device 32 connects ozone generator 28 with an oxygen source 34 and a presure gauge 36 indicates the pressure between regulating device 32 and ozone generator 28.

Sample conduit 12 is connected to a first or downstream capillary 40. Capillary 40 is in series with an upstream capillary 42 and capillary 42 is connected through a filter 44 to the gaseous sample mixture source 46. A pressure gauge 47 is connected to the junction of capillaries 40 and 42. A pressure gauge 48 is connected to the outlet 50 of the reaction chamber and an exhaust pump 52 connects outlet 50 with the atmosphere.

A bypass flow mechanism indicated by dashed line 54 comprises a rotameter 56 connected to the junction of capillary 40 with capillary 42. The outlet of rotameter 56 is connected to the inlet 58 of a bypass pump 60. Inlet 58 is connected through a pressure regulating device 62 and an air filter 64 to the atmosphere. Pressure regulating device 62 is connected to outlet 50 of the reaction chamber 10 and receives therefrom a reference pressure substantially equal to the pressure within reaction chamber 10.

As shown in FIG. 2, regulating device 62 comprises a housing 68 having a movable diaphragm 70 located therein to divide the interior into a reference chamber 72 and a controlled pressure chamber 74. A baffle 76 having a valve seat 78 separates the chamber 74 from an inlet air chamber 80. Reference chamber 72 is connected to reaction chamber 10, chamber 74 is connected to the inlet of pump 60, and chamber 80 is connected to the atmosphere through filter 64. A valve member 82 is connected to diaphragm 70 and a compressive spring 84 located in reference chamber 72 urges valve member 82 away from valve seat 78.

Pumps 52 and 60 both preferably are of the constant volume type. Capillaries 26 and 40 both provide relatively high flow restrictions while capillary 42 provides a somewhat lower flow restriction. Each of the capillaries typically is made of glass. Filter 44 preferably is made of porous sintered inert metal; stainless steel operated at approximately room temperature is suitable. Substantially pure oxygen is supplied by oxygen source 34 and ozone generator 28 produces a reactant mixture containing about 2 percent ozone with the balance oxygen.

Operation of the detector occurs in the following manner. Pumps 52 and 60 are started and ozone generator 28 is activated. Regulator 32 is adjusted to achieve a predetermined reading on gauge 36 that is known to produce the desired flow rate of reactant mixture into the reaction chamber at the operating pressure of the reaction chamber. A typical reaction chamber pressure is about 5 Torr and a typical reactant mixture flow rate is about 120 cc. per min.

Gaseous sample mixture is drawn from source 46 through filter 44 and capillary 42 to the junction of capillary 42 with capillary 40. Pump 52 draws some of the sample mixture reaching the junction through capillary 40 and into the reaction chamber. Pump 60 draws off sample mixture from the junction and draws air through filter 64 and regulator 62. Regulator 62 is adjusted manually to obtain a predetermined pressure reading on gauge 47, typically about 600–700 mm Hg. absolute, that produces the desired flow rate of sample mixture into the reaction chamber.

Regulating device 62 then begins monitoring the pressure difference between the junction of the capillaries and the reference pressure in the reaction chamber. Any decline in the pressure at the junction of the capillaries is converted by regulating device 62 into an increased air flow through the regulating device. Increased air flow through the regulating device reduces the amount of sample mixture flow from the junction of the capillaries to the inlet of the bypass pump and thereby restores the desired pressure at the junction of the capillaries. The constant pressure at the junction of the capillaries insures constant flow through capillary 40. Similar operation compensates for any increases in the pressure at the junction of the capillaries.

Halting sample mixture flow between sample source 46 and the junction of the capillaries is manifested by a reduction in the pressure at the junction. In the absence of rotameter 56, regulating device 62 can compensate for the pressure reduction in the manner described above without providing any external indication of the fact that no sample mixture is flowing into the reaction chamber. Including the rotameter and obtaining a flow indication therefrom avoids such errors.

Figure 3:
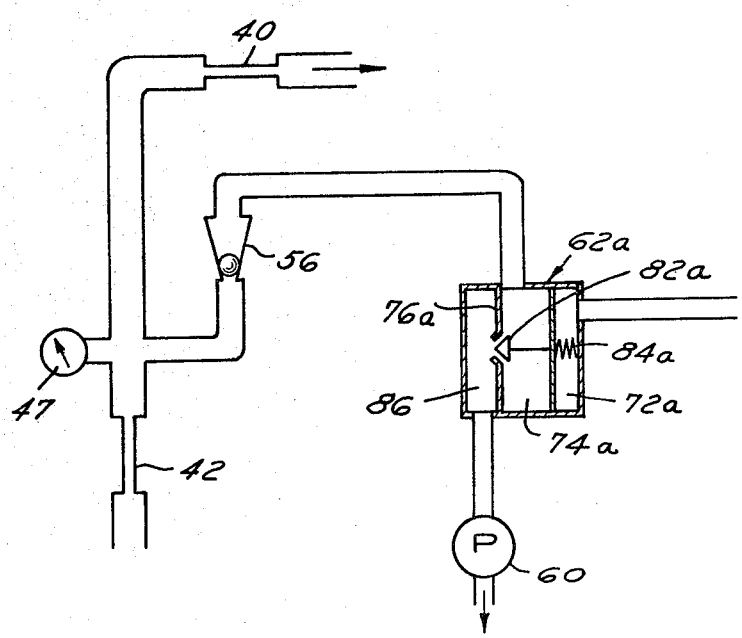
FIG. 3 is a detail of a bypass system in which the regulating device is located in the line connecting the bypass pump to the junction of the flow restricting devices. Some sample mixture contacts the regulator of FIG. 3, but that sample mixture does not participate in the analytical reaction.

In FIG. 3, a regulating device 62a is constructed similarly to regulating device 62 except that baffle 76a separates a controlled pressure chamber 74a from a pump inlet chamber 86 and spring 84a urges valve member 82a onto its valve seat 78a. Chamber 74a is connected to the outlet of rotameter 56 and chamber 86 is connected to the pump inlet. Operation occurs in a manner similar to that described above except that regulation is achieved by varying sample mixture flow through the regulating device and the bypass pump instead of varying air flow through an auxiliary line. The life of the regulating device of FIG. 3 is less than that of FIG. 2 but the FIG. 3 system avoids any contamination of the sample mixture reaching the reaction chamber by the flexible diaphragm of the regulating device.

Other flow indicating devices can be substituted for rotameter 56 if desired. Note also that the ability of a good rotameter to function as a check valve to prevent flow into the junctions of the capillaries also can be used to determine if proper sample mixture is reaching the junction of the capillaries. In such a system, an undue restriction in capillary 42 or upstream thereof is manifested by a declining pressure indication on gauge 47 which alerts the operator to the fact that insufficient sample mixture is reaching the reaction chamber (see FIG. 3). A check valve can be substituted for such a rotameter if desired. Controlling the pressure regulating device across the downstream capillary as shown permits the regulating device to maintain the pressure at the junction of the capillaries as a function of the pressure drop through the downstream capillary without any interference from the atmosphere or other system components.

Thus this invention provides a gas flow control system for an analytical instrument that maintains automatically a constant flow rate of sample mixture into the reaction chamber. The invention is useful particularly in a chemiluminescent detector but it also can be used in other analytical instruments requiring a constant sample mixture flow rate.

I claim:

1. In an instrument for measuring analytically the amount of a gaseous constituent in a gaseous sample mixture by introducing the gaseous sample mixture into a reaction chamber and measuring a characteristic of the gaseous constituent within the reaction chamber, a flow control system for maintaining accurate flow of the gaseous sample mixture into the reaction chamber comprising an upstream flow restricting device and a downstream flow restricting device in series with each other for conducting the gaseous sample mixture to the reaction chamber, bypass flow means connected to the junction of the upstream flow restricting device with the downstream flow restricting device, said bypass flow means including a bypass pump for drawing off a portion of the gaseous sample mixture that has passed through the upstream flow restricting device and regulating means responsive to the pressure difference between the junction of the flow restricting devices and the reaction chamber for regulating the pressure at the junction of the flow restricting devices, and an exhaust pump connected to the reaction chamber for drawing gaseous sample mixture from the junction of the flow restricting devices through the downstream flow restricting device and into the reaction chamber.

2. The instrument of claim 1 in which the bypass flow means comprises a flow indicating means located between the junction of the flow restricting devices and the inlet of the bypass pump.

3. The instrument of claim 1 in which each of the flow restricting devices is a glass capillary tube.

4. The instrument of claim 1 in which the reaction occurring within the reaction chamber produces chemiluminescence.

* * * * *